United States Patent [19]
Ganser et al.

[11] Patent Number: 5,635,809
[45] Date of Patent: Jun. 3, 1997

[54] ACTUATING-ELEMENT POSITIONING SERVO-DRIVE DEVICE

[75] Inventors: Martin Ganser, Weil der Stadt; Volker Petri, Aidlingen; Reinhold Mickeler, Altdorf, all of Germany

[73] Assignee: Mercedes-Benz AG, Germany

[21] Appl. No.: 419,646

[22] Filed: Apr. 7, 1995

[30] Foreign Application Priority Data

Apr. 7, 1994 [DE] Germany ............... 44 11 935.6

[51] Int. Cl.$^6$ ................................ G05F 1/10
[52] U.S. Cl. ................. 318/650; 318/560; 475/92
[58] Field of Search ................ 318/650, 560, 318/567, 568.24; 475/92; 454/266, 269, 265

[56] References Cited

U.S. PATENT DOCUMENTS

| 4,684,858 | 8/1987 | Ma et al. |
| 4,746,772 | 5/1988 | Bovee et al. |
| 4,817,912 | 4/1989 | McCabe ............... 454/269 X |
| 5,236,393 | 8/1993 | Milewski ............... 454/266 |

FOREIGN PATENT DOCUMENTS

| 0424831A2 | 10/1990 | European Pat. Off. |
| 2159651 | 5/1973 | France. |
| 3346366A1 | 12/1983 | Germany. |
| 3514223A1 | 4/1985 | Germany. |
| 3832474A1 | 4/1989 | Germany. |
| 3935593A1 | 5/1991 | Germany. |
| 3933266A1 | 5/1991 | Germany. |
| 3835773C2 | 11/1992 | Germany. |
| 4224610C1 | 1/1994 | Germany. |

OTHER PUBLICATIONS

Herbert Sax, Laststromerfassung in getakteten Motorbrücken, Industrieelektronik, me Bd. 5 (1991) Heft 6, 4 pages.

*Primary Examiner*—Karen Masih
*Attorney, Agent, or Firm*—Evenson, McKeown, Edwards & Lenahan, P.L.L.C.

[57] ABSTRACT

A servo-drive device is provided for an actuating of, for example, ventilation dampers in motor-vehicle air-conditioning installations element which can be stably positioned in a plurality of positions, d.c. motors with a gear mechanism are used for servo-drive devices of this type. A mechanical system which is moved at the same time and has potential energy varying along its path of movement is coupled to the servo drive such that it influences the current of the servo motor to permit the respective position of the actuating element to be identified by a control device on the basis of the evaluation of the motor current characteristically which depends on the force exerted by the mechanical system on the actuating element.

4 Claims, 4 Drawing Sheets

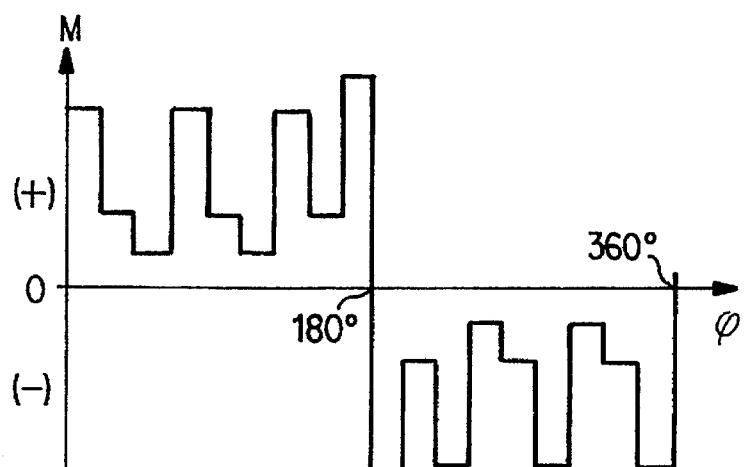
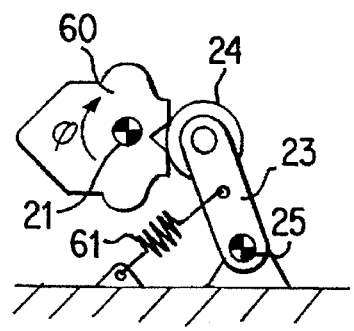
FIG. 6    FIG. 6A
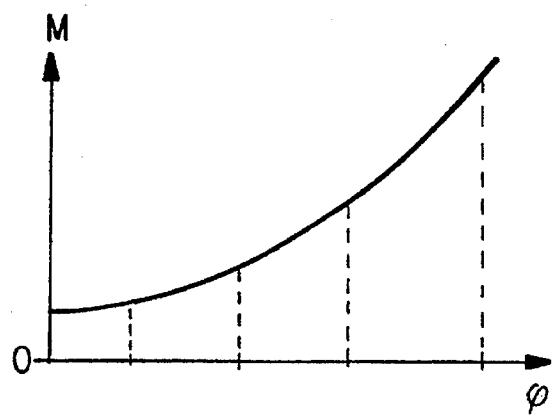
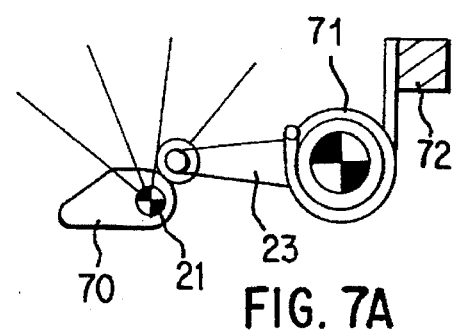
FIG. 7    FIG. 7A
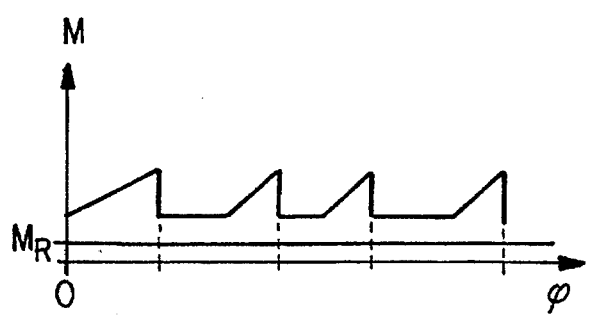
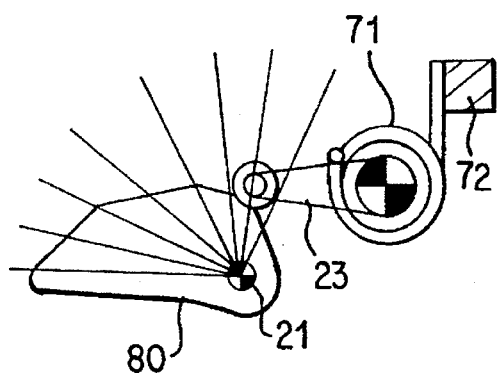
FIG. 8    FIG. 8A 5,635,809

ACTUATING-ELEMENT POSITIONING SERVO-DRIVE DEVICE

BACKGROUND AND SUMMARY OF THE INVENTION

The present invention relates to a servo-drive device for the positioning of an actuating element, the setting range of which comprises a plurality of stable setting positions, and more particularly, to a servo-drive device having a servo motor configured to drive the actuating element and a control device configured to control the servo motor and to identify actuating-element position with motor current.

Servo-drive systems serve, for example, to adjust and position ventilation dampers in a motor vehicle or other final control elements of closed-loop or open-loop control circuits. Conventional stepping motors with gearing, d.c. motors with a flange-mounted potentiometer at the gear output, d.c. geared motors with Hall sensors integrated in the motor and pneumatic devices provide the drive. In order to prevent unintentional adjustment of the actuating element by external disturbances, in the case, for example, of a ventilation damper by the effect of the air stream, it is customary in servo drives with a gear mechanism to use a self-locking gear mechanism. With a stepping motor, the positioning of the actuating element is performed by step-by-step driving and counting of the triggering pulses; in the case of a d.c. motor provided with a potentiometer, the positioning is performed by measuring the potential voltage proportional to the angle of adjustment, in the case of a d.c. motor provided with a Hall sensor, the positioning is performed by counting the Hall pick-up pulses and in the case of pneumatic actuating elements, the positioning is performed, for example, by a flange-mounted potentiometer.

If the position detection is performed by a position sensor system, a separate electrical supply line is needed which, for example, in a motor-vehicle air-conditioning installation with about 10 damper-adjusting units represents a considerable additional outlay. If a simple d.c. motor is used, the outlay for the position check-back signal is consequently about as great as for the actual drive motor. With pneumatic actuating elements, a pressure-supply device for generating above-atmospheric and below-atmospheric pressure and also suitable solenoid valves for individual triggering of the final control elements are required.

DE 38 35 773 C2 shows a servo drive for an air-conditioning installation in which, for positioning, contact brushes which lie in the motor circuit and move at the same time when there is an adjusting movement are arranged such that they can be electrically connected via an opposing, fixed printed conductor pattern. To be able to bring a damper, located in the air stream, into various setting positions with this servo-drive, the printed conductor pattern is connected to a corresponding number of user-operable setting switches and is designed such that, when a switch is operated, the motor circuit between the two brushes remains closed via a printed conductor pattern until, due to the turning motion, the brushes assume a position in relation to the printed conductor pattern in which the motor circuit is interrupted. This position then corresponds to the desired damper position, in which the damper subsequently remains, on account of the interrupted motor circuit, until some other requirement arises by the user operating the switch.

It is known, furthermore, from, by way of example, DE 33 46 366 A1, DE 35 14 223 A1 and DE 39 33 266 A1 to detect the current intensity in the circuit of the servo motor and to drive the servo motor in a way dependent on the current intensity. Based on this principle are, for example, arrangements which, if an obstacle is detected in the travel of the actuating element, switch off the servo motor and/or operate it in the reverse direction, for example, as a protection against damage to the actuating element or as a protection against jamming.

Furthermore, DE 39 35 593 A1 describes a device for controlling the temperature in a motor vehicle interior in which, to be able to dispense with the expensive potentiometer for position identification, a d.c. motor is driven under clock control and the position identification is performed by evaluating the detected motor current in that a motor current edge identification is carried out for each further running of a motor armature segment. These identified edges are counted, and this counted value serves the controller as a measure of the position of the final control element. Apart from the pulse-counting device required, in the case of this servo-drive system suppression of the natural running-on of the d.c. motor is provided.

DE 38 32 474 A1 describes a servo drive with which a dividing wall for optionally closing one or two intake paths of an air-conditioning unit can be positioned by a simple electric motor, which can be driven in one rotational direction, and a counteracting spring element optionally in one of the two end positions of the setting range, defined by end stops, without the possibility of setting a stable intermediate position. For this purpose, the motor and the spring element are matched to each other so that the torque generated by the motor is greater than the maximum torque which can be generated by the spring restoring force. When the servo motor is switched on, the dividing wall consequently assumes the end position corresponding to its direction of torque. From that end position, the dividing wall then can be moved into the other end position and held there by simple switching off of the motor, on account of the restoring action of the spring element.

An object of the present invention is to provide a servo-drive device which can be realized with comparatively little outlay and permits a positioning of the actuating element in each of the plurality of envisaged setting positions which is exact and stable with respect to external effects.

This object has been achieved in accordance with the present invention by a servo-drive device by a mechanical system moved at the same time as adjusting movement of the actuating element, having potential energy varying along its path of movement, wherein motor current characteristic over an actuating-element setting range is determined by force exerted by the mechanical system on the actuating element.

The variation of the potential energy of the mechanical system over the setting range of the actuating element results in corresponding fluctuations of the force exerted by the mechanical system on the actuating element and consequently of the current intensity in the circuit of the servo motor during an adjusting movement. The motor is, of course, sized and configured such that the torque which can be generated by it is greater than the maximum counteracting moment exerted by the mechanical system. The control device is consequently able to identify the respective position of the actuating element by the motor current detection on the basis of the motor current fluctuations effected by the mechanical system and specific to the position of the actuating element, without requiring a dedicated position sensor system for the actuating element or for the motor, with corresponding signal lines to the control device.

According to another aspect of the present invention, positions of local minima of the potential energy of the coupled mechanical system define stable setting positions envisaged for the actuating element. A consequent major advantage is that the exact positioning of the actuating element by the mechanical system can be ensured and therefore no correspondingly expensive control for the servo motor is necessary. The servo motor only has to be chosen such that in operation it overcomes the forces acting on the actuating element from the mechanical system. As soon as the control device establishes, by evaluation of the motor current variation, that the actuating element is located in the drawing-in region of the local minimum of the potential energy of the mechanical system associated with the desired setting position, the exact positioning can be performed in a simple way by switching off the motor, under the action of the mechanical system alone. Then, the mechanical system moves automatically into this local minimum of the potential energy which, in turn, corresponds exactly to the desired position of the actuating element. Therefore, precision timing of the switching off of the motor current is not required for the exact positioning of the actuating element. For the same reason, the customary measure of electrically short-circuiting the motor when stopping it, for the purpose of preventing run-on, is also not required. Furthermore, the assignment of a local minimum of the potential energy of the mechanical system to each stable actuating-element setting position has the effect that the actuating element is held stably with respect to external effects in the respectively desired position by the restoring forces of the mechanical system, without for example a self-locking gear mechanism being required for this purpose.

Another feature of the present invention is that the motor is in each case switched off by the control device after reaching the drawing-in region of the required position of the actuating element formed by the mechanical system, as soon as an increase in motor current is established there. On account of the restoring forces of the mechanical system occurring upon leaving the energy minimum, in each case a usually considerable and consequently easy-to-detect increase in motor current occurs in the vicinity of a stable actuating element position.

Alternatively, the motor circuit is interrupted by the mechanically operable switching element in the vicinity of each stable actuating element position. This motor circuit interruption is replayed by the control device, by way of suitable closing of the parallel switching element, in each case until the system is again outside this vicinity or the drawing-in region of the desired setting position is reached.

BRIEF DESCRIPTION OF THE DRAWINGS

These and other objects, features and advantages of the present invention will become more readily apparent from the following detailed description thereof when taken in conjunction with the accompanying drawings wherein:

FIGS. 2 to 8 are schematic views of several versions of mechanical systems which can be used for the servo-drive device according to FIG. 1, the mechanical system of each version being respectively shown in side view in the right-hand of each figure and the associated torque/angle-of-rotation diagram being respectively reproduced in the left-hand of the respective figure.

DETAILED DESCRIPTION OF THE DRAWINGS

Figure 1:
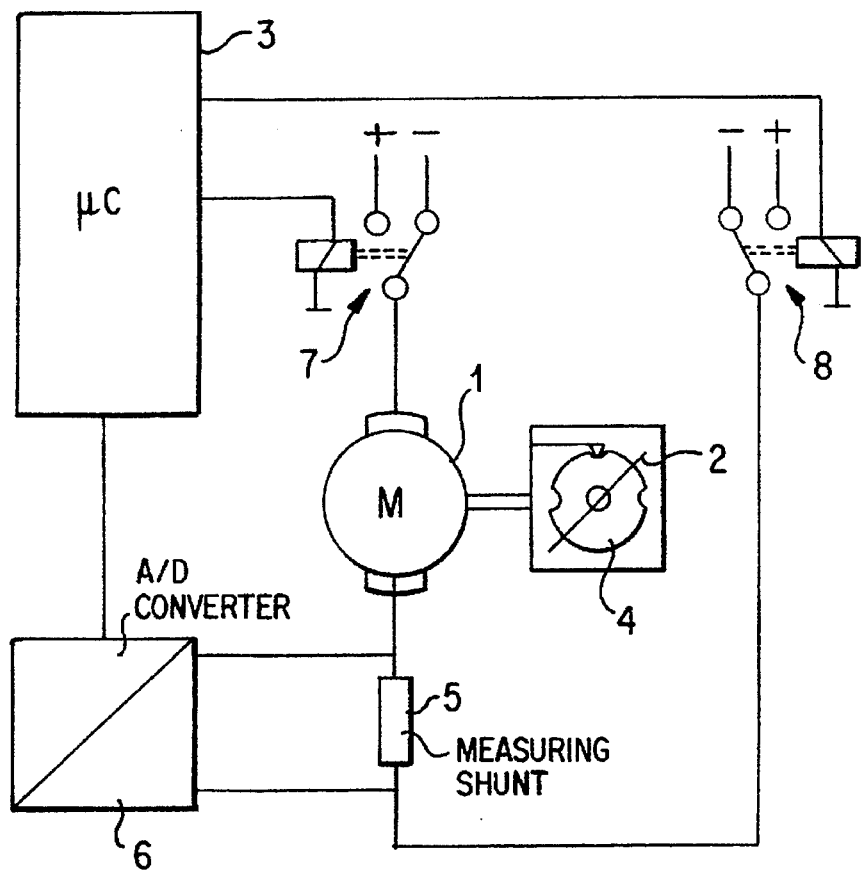
FIG. 1 is a block diagram of a servo-drive device for the air damper of a motor-vehicle air-conditioning installation in accordance with the present invention.

The servo-drive device shown in FIG. 1 comprises a simple d.c. motor 1 with two possible directions of rotation and also a micro-controller 3 as the control device for driving the motor. Motor driving is performed by a corresponding control of two relays 7, 8, which are looped into the motor circuit and by which each motor terminal can be optionally connected to the positive or negative vehicle battery voltage. With connection to unlike terminals, the motor is activated in one of the two possible directions of rotation, whereas with connection to the like terminals, as in the case specifically shown in FIG. 1 of the connection to the negative battery voltage, it is switched off.

The current intensity in the motor current is sampled via a measuring shunt 5, and the associated sensor signal is fed via an A/D converter 6 to the micro-controller 3 as input information. A ventilation damper 2 is coupled as an actuating element of the motor-vehicle air-conditioning installation to the servo motor 1 via a non-self-locking gear mechanism. Coupled to the ventilation damper 2 is a mechanical system 4, which is indicated schematically in FIG. 1 and which fixes the stable positions of the multistage-adjustable ventilation damper 2. The mechanical system 4 of FIG. 1 can comprise, for example, a disc which is seated non-rotatably or fixedly on the same shaft as the ventilation damper 2, and is provided with three notches at angle-of-rotation intervals of respectively 90° and a leaf spring with a cam at one end, pressing against the circumference of the disc. By engagement of this cam in one of the three notches in each case, this mechanical system 4 then makes available three setting positions for the ventilation damper 2 which are stable with respect to external effects, because, upon engagement of the cam in one of the notches, the mechanical system 4 is, in each instance, at a local minimum of its potential energy (here the elastic energy of the leaf spring) from which the mechanical system 4 and the ventilation damper 2 coupled thereto can be brought out only by a marked expenditure of force, such as is provided by the servo motor 1 upon activation of the same.

Figure 1A:
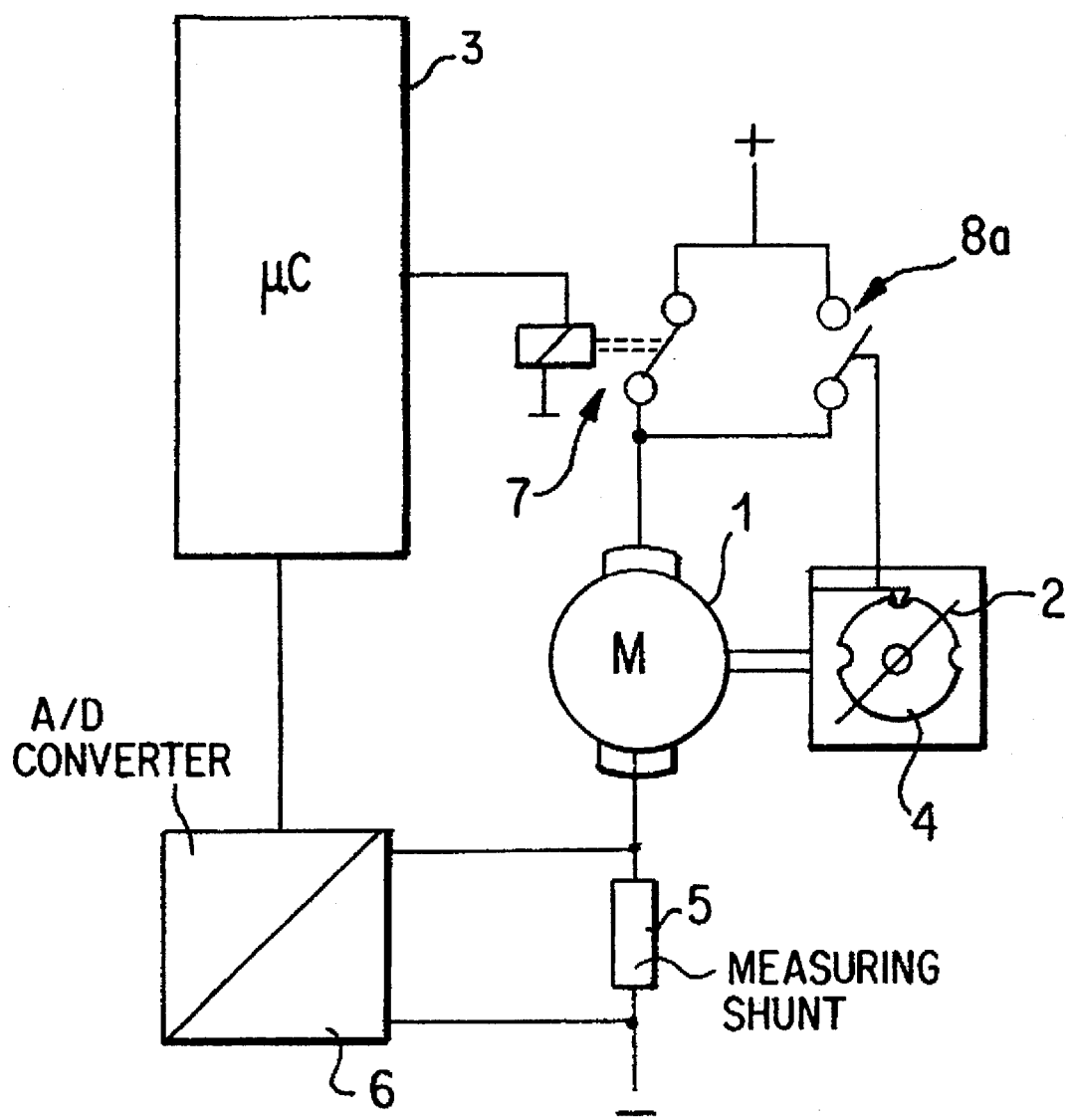
FIG. 1A is a block diagram of another embodiment of a servo-drive device using switching elements in parallel in the motor power circuit.

With regard to the embodiment shown in FIG. 1A, two switching elements 7, 8a are connected in parallel in the motor power circuit between the positive voltage supply and the negative voltage supply. One switching element is a relay 7 controlled by the control device 3, and the other switching element 8a is a mechanically operable switching element controlled by the mechanical system 4 by being coupled to the adjusting movement of the actuating element 2. In the vicinity of a stable adjustment position of the actuating element, the switching element 8a is moved into the open position, and otherwise is moved into the closed position. Specifically, the switching element 8a can be coupled, for example, with the pivoted lever 23 of the systems in FIGS. 2 and 3 described below so that the switching element 8a is opened when the pivoted lever 23 is in the vicinity of its lower, stable reversing position, and it is closed when the pivoted lever 23 is lifted by the action of cam disk 20, 30 over this adjacent area of the lower reversing position.

The advantage of this embodiment is that actuating motor 1 is switched off automatically at the correct time without the control device 3 having to detect accurately the increase in motor current. The control device 3 recognizes the shutoff of the motor current automatically performed by the mechanical system 4 and can thus detect when a stable actuating element position has been reached. As long as the desired actuating element position has not been reached, the motor power circuit again is immediately closed by appropriately controlling the relay 7, advancing to the next stable actuating element position.

With reference now to FIGS. 2 to 8, details of various embodiments of the present invention are described. The mechanical system schematically shown on the right-hand half of FIG. 2 comprises a cam disc 20, which is seated jointly with the ventilation damper 2 (not separately shown in FIGS. 2 to 5), non-rotationally or fixedly on a drive shaft 21 leading off from the gear mechanism. A plurality of cams 22 are formed on the circumference of the cam disc 20. The number of cams 22 depends on the number of desired positions which can be stably set for the ventilation damper 2. Four cams are explicitly shown in FIG. 2.

A pressing roller 24, rotatably mounted at one end of a swivel lever 23, bears against the circumference of the cam disc 20, with the swivel lever 23 being rotatably mounted by its other end on a fixed-in-place shaft 25. A compression spring 26, which is supported such that it is fixed in place, acts on the swivel lever 24.

A driving movement for adjustment of the actuating element 2 thus has the consequence that the pressing roller 24 rolls on the circumference of the cam disc 20. Each cam causes a deflection of the swivel lever 23 so that the spring 26 is compressed. The spring energy represents the potential energy of the mechanical system, and thus the positions of the pressing roller 24 between two cams correspond to a local minimum of the potential energy of the mechanical system and thus to a stable rest position of the same. In the case of the embodiment of FIG. 2, there is an entire angle-of-rotation interval $dw_1$ as the region of minimum potential energy between two cams 22. Adjustments of the actuating element within such a region $dw_1$ are opposed by a frictional moment $M_R$ which is produced by the frictional force between the pressing roller 24 and the circumference of the cam disc 20.

The mode of operation of the servo drive with the mechanical system of FIG. 2 can be explained with reference to the diagram shown to the left of FIG. 2 which schematically represents the dependence of the torque M exerted by the mechanical system on the actuating-element rotating spindle 21 as a function of the angle of rotation $\phi$, with the rotational and torque directions being seen in the right-hand side of FIG. 2.

Starting from a rotation angle equal to zero, which corresponds to a pressing roller position between two cams, the rotation of the actuating element shaft 21, and thus of the cam disc 20, upon activation of the servo motor 1 cause the pressing roller 24 to come into contact with the front flank of a cam, in the case of an angular position S1. The running of the pressing roller 24 against this cam front flank effects a compressing of the compression spring 26, whereby the torque exerted on the cam disc 20 and thus the actuating-element shaft 21 by the mechanical system increases until the pressing roller 24 has reached the tip of the cam, after which the pressing roller 24 comes to bear against the cam rear flank. A reversal of the torque is now exerted by the mechanical system on the actuating-element shaft 21, until the pressing roller 24 has rolled right along the cam rear flank, and thus the torque M exerted by the mechanical system has reached from below the friction-induced torque value $M_R$ again. This is followed by a region $dw_1$ of minimum potential energy of the mechanical system, in which the pressing roller 24 is located between two cams 22. Upon further turning, the pressing roller 24 comes into contact with the front flank of a next cam, in the angular position S2 of the actuating-element shaft 21, after which the above-described sequence is repeated.

Figure 2:
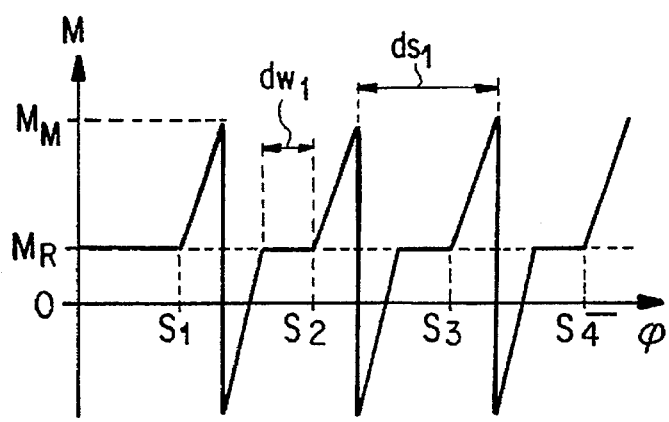
Figure 2A:
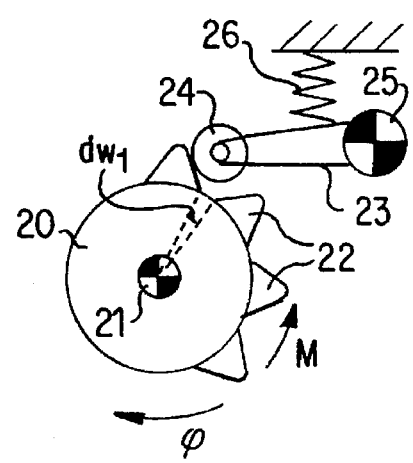

Hence, with the arrangement of FIG. 2, the actuating element 2 is able to be positioned stably in each case in the plateau regions $dw_1$ of the torque M exerted by the mechanical system, with the friction-induced torque $M_R$ counteracting an adjusting movement of the actuating element within this plateau region $dw_1$. If this frictional moment is chosen greater than the maximum moment to be expected by external effects on the actuating element, this friction stabilizes the position of the actuating element against such effects from outside. In any event, the maximum restoring moment $M_M$ of the mechanical system, represented by the cam tip regions, is greater than this maximum torque effect from outside, in order to prevent unintentional adjustments of the actuating element. An exact punctiform (or point) positioning, instead of a regional (or area) positioning of the actuating element in the positions which can be stably set is desired, can be achieved with the arrangement of FIG. 2 if the plateau region $dw_1$ is reduced to a point, for example by the rear flank of a preceding cam being immediately followed in each case by the front flank of a following cam. The actuating element is then in each case exactly positionable in a punctiform manner in the positions in which the pressing roller pressing roller 24 lies precisely centrally between two adjacent cams 22.

The servo motor 1 is configured such that the torque it generates is greater than the peak value $M_M$ of the counteracting moment generated by the mechanical system, in order that the actuating element can be adjusted within its entire setting range by activation of the motor. The motor current variation during an adjusting movement, measured by the control device 3, corresponds to the variation shown of the torque exerted by the mechanical system to the extent that the motor current increases when the counteracting torque becomes higher and decreases when the retroactive torque effect becomes lower. Therefore, the control device 3 can detect by measuring of the motor current whether the drive has started up and whether a stable dwell position for the actuating element has been reached. Therefore, a multi-stage adjusting capability is defined by the arrangement of more than two cams shown in FIG. 2, and the control device 3 determines the desired setting position by counting off the successive stable actuating positions, i.e. by counting off the successive increases in motor current.

As a result, the coupling of the mechanical system shown in FIG. 2 to the servo-motor/adjusting-element arrangement has the advantage that the end phase of a positioning operation for setting a desired, stable actuating-element position can be taken over by the mechanical system and an exact switching-off instant for the servo motor 1 is not critical. Rather, the servo motor 1 can be switched off within an angle-of-rotation interval $ds_1$, shown in the diagram of FIG. 2, if the actuating element is to be positioned in the punctiform or regional position included in this region.

A switching-off at the angle-of-rotation positions S1 to S4 which occur when the pressing roller 24 comes into contact with the cams 22 is favorable because, at this instant, a marked increase in the torque acting from the mechanical system takes place in each case, which for its part results in a similar marked increase in the motor current for the servo motor 1. The detection of such an increase in current can in turn be realized in a simple way without great outlay for circuitry. The theoretically possible switch-off angle-of-rotation region $ds_1$ is thus given by the angle-of-rotation distance between the tips of two neighboring cams, which respectively represent a local maximum of the potential energy of the mechanical system. The mechanical system thus offers a latching function for holding the actuating element in the respectively desired position. As there is no longer any necessity for exact actuating-element positioning by the motor drive, there is also no need for precautionary measures to be taken for electrically short-circuiting the motor to prevent run-on.

The number and position of the cams 22 on the circumference of the cam disc 20 can be varied according to the particular application of the system. It is possible to provide, according to the actuating element arranged, a periodic further turning of the actuating element, and thus of the cam disc 20, or a movement back and forth between two end positions which are defined by corresponding end stops. Thus, for example, the angle-of-rotation positions 0, S1, S2, S3, S4 may correspond to a degree of ventilation damper opening of 0%, 25%, 50%, 75% and 100%, respectively.

In FIGS. 3 to 8, which are analogous to FIG. 2, further versions of suitable mechanical systems are presented, functionally identical elements in each case being provided with the same reference numerals, and the following description of these versions being restricted mainly to the differences in comparison with the arrangement of FIG. 2, otherwise referring to the description of the latter.

Figure 3:
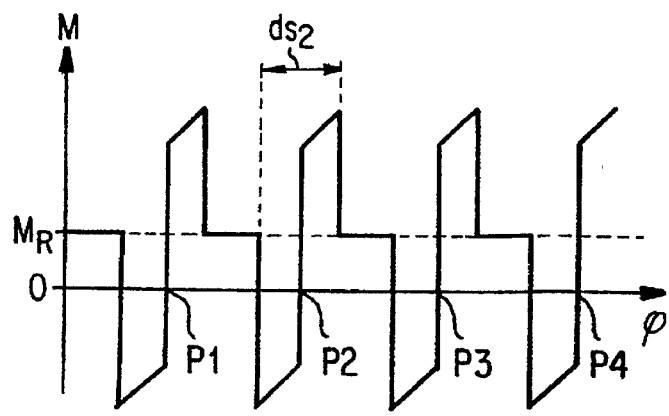
Figure 3A:
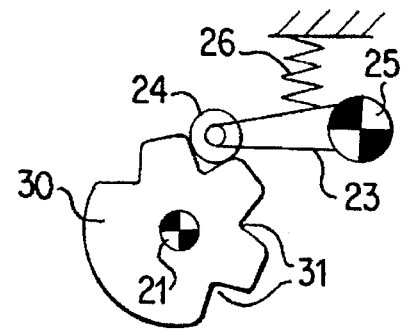

In the version of FIG. 3, with an otherwise identical mechanical construction, a notched disc 30 is used instead of the cam disc 20 of FIG. 2. The notched disc 30 has a plurality of notches 31, which define the local minima of the potential energy of the system, while the circumferential regions of the disc lying in between represent the regions with locally maximum potential energy. The notches 31 are configured such that in each case a punctiform local potential energy minimum is obtained in the angle-of-rotation positions P1 to P4 assigned to the respective notch center, instead of the regional local minima $dw_1$ of FIG. 2. With this arrangement, the actuating element is consequently able to be positioned in each case in a punctiform manner exactly in one of these stable angle-of-rotation positions P1 to P4. The switch-off region $ds_2$ possible for the setting of a particular stable actuating-element position, for example the position P2, and shown in the associated torque/angle-of-rotation diagram, i.e. the angle-of-rotation region in which the motor 1 can be switched off for reaching this actuating-element position, corresponds to the angle-of-rotation distance between the front edge and rear edge of a notch. The motor can be switched off at any desired point within this region $ds_2$, after which the actuating element is kept positioned by the action of the mechanical system exactly in the desired position, for example P2, and is kept latched there, secured against unintentional adjustments caused by disturbances. By various shaping of the notches, it is moreover possible in the case of this type of example to configure the rising and/or falling regions of the torque characteristic differently, and in this way specifically to the position of the actuating element. Thus, the motor control can identify the position without a counting operation directly by evaluating the then not strictly periodic motor current variation from notch to notch.

Figure 4:
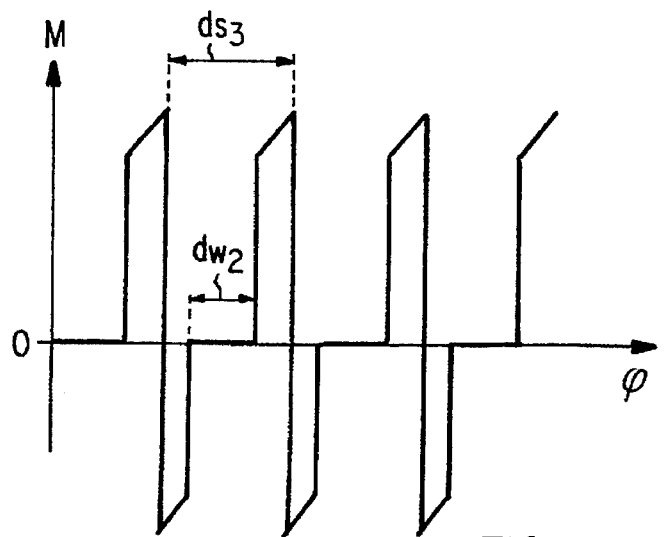
Figure 4A:
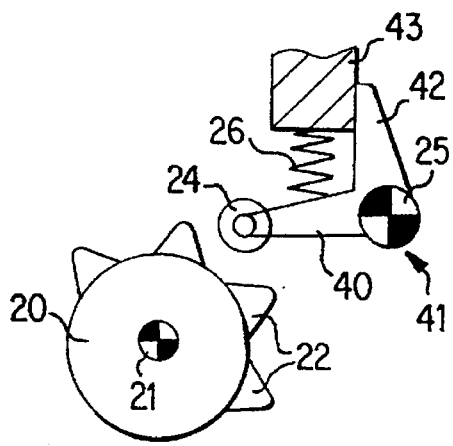

In the case of the mechanical system shown in FIG. 4, in comparison with that of FIG. 2, the swivel lever 23 of the latter is replaced by an L-shaped lever 41. One arm 40 of the lever 41 assumes the function analogous to the swivel lever 23 of FIG. 2, and an angle-of-rotation limitation for the lever 41 is provided by the other lever arm 42 together with a neighboring, fixed-in-place wall 43. This limitation has the consequence that the pressing roller 24 only comes into contact with the cam 22 at approximately half the cam height, while in the lower-lying regions of the cam disc 20 there is no contact with the pressing roller 24. This measure has the effect of eliminating the frictional moment $M_R$ in the regions between the cams, i.e. there is no longer any friction-induced torque in the plateau regions $dw_2$ of locally minimal energy of the mechanical system. Accordingly, in the associated torque/angle-of-rotation diagram, these plateau regions $dw_2$ lie on the angle-of-rotation axis. The possible switch-off period of time $ds_3$ for switching off the servo motor for the purpose of reaching a particular stable actuating-element position contained therein is obtained analogously to that $ds_1$ of FIG. 2 as the angle-of-rotation distance between the tips of two neighboring cams 22.

Figure 5:
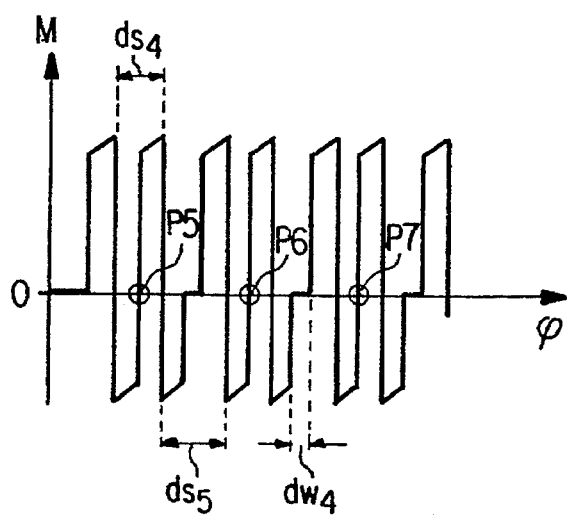
Figure 5A:
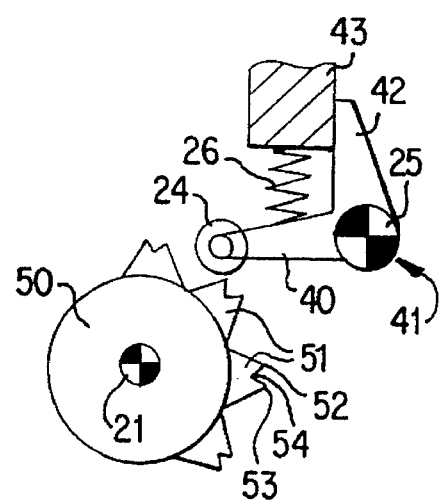

The mechanical system of FIG. 5 represents a combination of the versions of FIGS. 3 and 4, in that instead of the cam disc 20 of FIG. 4 a combined cam-notch disc 50 is used. A plurality of cams 51 are provided on the circumference of the disc 50 and each cam 51 has a notch 54 in the tip region. This system combines the advantages of extensive freedom from friction and an exact, latched positionability of the actuating element. The extensive freedom from friction is ensured analogously to the system of FIG. 4 by the lever 41 with a limited angle of rotation. By latching of the pressing roller 24 in each of the notches 54 of the cams 51, an exact, latched actuating-element positioning is defined, analogously to the notch arrangement of FIG. 3. In the associated torque/angle-of-rotation diagram, three of these punctiformly latching actuating positions P5, P6, P7 are drawn in. The associated switch-off region $ds_4$, in which the servo motor 1 can be switched off to achieve a dwell position contained therein, is obtained as the angle-of-rotation distance between the tips of the two cam humps 52, 53 formed by a respective cam notch 54. In addition, the actuating element may be brought by the coupled mechanical system of FIG. 5, analogous to the arrangement of FIG. 4, into stable regional settings $dw_4$, in which the pressing roller 24 is located between two notches 51 without contact with the cam-notch disc 50. The switch-off region $ds_5$ associated therewith is determined by the angle-of-rotation distance between a rear hump of a preceding cam and a front hump of a following cam.

The systems represented in FIGS. 6 to 8 are systems in which, after switching off the motor without a self-locking gear mechanism, an emergency resetting into a distinctly defined initial position takes place. The mechanical system is configured such that, over the entire setting region, there is only a single minimum of the potential energy, which is assigned to this initial position of the actuating element.

In the version of FIG. 6, similar to the versions of FIGS. 2 and 3, the lever arm 23 mounted at one end on a spindle 25 bears with its pressing roller 24 at the other end, here under the action of a tension spring 61, resiliently against a cam shaft 60 seated non-rotationally on the actuating-element drive shaft 21. The cam shaft 60 is shaped such that the potential energy of the mechanical system 4 varies in a characteristic way between a minimum value, which the system assumes in the cam-disc position shown, and a maximum value, which the system assumes in the position turned through 180° with respect to the position shown, so that the torque/angle-of-rotation characteristic shown is obtained. On the basis of this characteristic curve, which results from the different shaping of the individual notches in the cam disc 60, the control device for driving the motor is able to determine the actuating-element position without counting off the individual notch positions. The notches are, furthermore, shaped such that they result in an only slower increase in the potential energy of the mechanical system 4, but also do not form any local minimum of the potential energy with the exception of that notch which interacts with the pressing roller in the position shown. This is reflected in the torque characteristic by the fact that it has a zero crossing only at 0°, the location of the local minimum of the potential energy, and at 180°, the location of the local maximum of the potential energy. In this way, an automatic emergency resetting into the stable actuating-element position shown is obtained when switching off the motor and when using a non-self-locking gear mechanism.

In the version of FIG. 7, the resetting of a lever arm 23 rotatably mounted at one end with pressing roller 24 and at the other end about a fixed-in-place shaft 25, as in the example of FIG. 2, is performed by a spiral spring 71 which is held fixed in place at one end and is in connection with the lever-arm shaft 25 at the other end. The pressing roller 24 thus bears resiliently against a cam disc 70 which is of an approximately oval shape and is mounted eccentrically on the actuating-element drive shaft 21. As a result, in a position in which the pressing roller 24 has the smallest distance from the actuating-element drive shaft 21 there is a local minimum of the potential energy of the mechanical system 4, from which the associated torque characteristic increases strictly monotonously as far as the cam-disc position turned through 180°, which is also transferred to the motor current characteristic. Consequently, the control device for the servo motor 1 is able to identify the position of the actuating element in a simple way on the basis of the respective motor current value. At the angle-of-rotation position of 180°, the potential energy then again passes through a maximum, from which, due to the special shaping of the cam disc 70, the potentially energy drops rapidly to a minimum value (not explicitly drawn in the torque characteristic shown). Also, in the case of this exemplary embodiment, there is consequently an emergency resetting into the initial position of the actuating element, distinctly defined by the associated local minimum of the potential energy, when switching off the motor and using a non-self-locking gear mechanism.

FIG. 8 shows a modification of the example of FIG. 7 with regard to the shaping of the cam disc 80. Specifically, the outer circumference of the cam disc 80 is provided with straight sections which adjoin one another to form kinks. Consequently, the illustrated associated torque characteristic is obtained in which the torque is always approximately constant and above the friction-induced value $M_R$ in the straight portions of each section and increases in a sawtooth form between two sections when running over the respective kink or corner from whence it drops again.

The control device of FIG. 8 can, therefore, identify the actuating-element position by counting off the number of torque sawteeth run over. In this version as well, there is only one local minimum and one local maximum of the potential energy of the mechanical system 4 over the entire angle-of-rotation range, with corresponding zero crossings of the torque at these angular positions (not explicitly shown in FIG. 8), so that for this arrangement also the emergency resetting to the point of local minimum potential energy of the mechanical system is obtained when switching off the motor without a self-locking gear mechanism.

While the versions of FIGS. 6 to 8, respectively, effect an emergency resetting to a specific initial setting of the actuating element, the versions of FIGS. 2 to 5 have in common that the coupled actuating element can be positioned stably in various positions by the mechanical system through formation of corresponding local minima of the potential energy, without requiring for this purpose, for example, a self-locking gear mechanism between the servo motor and actuating element or run-on prevention for the servo motor. Since the exact positioning of the actuating element is assumed by the mechanical system, the outlay for an exact switching off of the servo motor is dispensed with. Rather, the motor can be switched off within a comparatively large range, and preferably being chosen within this range a switch-off point at which there is a change in the motor current which is distinct and can therefore be evaluated with little outlay on circuitry.

The characteristic influence of the motor current characteristic which the present invention envisages being carried out by the coupled mechanical system moved at the same time with varying potential energy and the determination of the motor switching-off instant with the motor current characteristic instant also means that a position sensor system with corresponding electrical connecting lines is unnecessary for identifying the actuating-element position. Consequently, the entire servo-drive device can be constructed from inexpensive components. Apart from the arrangement shown with a rotationally movable actuating element, arrangements with a different type of actuating-element movement, for example linear, may also be provided with the coupling of a mechanical system moved at the same time.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Servo-drive device for positioning of an actuating element, comprising a servo motor configured to drive the actuating element, a control device configured to control the servo motor and to identify actuating-element on the basis of measured motor current, and a mechanical system configured to be moved at the same time as adjusting movement of the actuating element, having potential energy varying along a path of movement thereof, wherein the mechanical system is operatively related to the actuating element to exert a force on the latter and thereby determine motor current characteristic in an actuating-element setting range.

2. The servo-drive device according to claim 1, wherein a variation of the potential energy of the mechanical system comprises regions with locally minimal potential energy associated with a stable setting position of the actuating element.

3. The servo-drive device according to claim 2, wherein, with an adjusting movement of the actuating element into a required setting position, the control device is configured to guide the actuating element by the servo motor into an associated region of locally minimal potential energy of the mechanical system and thereafter switch off the motor as soon as an increase in motor current is identified thereby.

4. The servo-drive device according to claim 2, wherein two electrical switching elements are looped into the motor circuit in parallel, of which one is arranged to be controllably operated by the control device and the other is arranged to be operated mechanically and coupled to actuating-element adjusting movement so as to be open in a vicinity of a stable actuating-element setting position and otherwise be closed.

* * * * *